US00RE39311E

(19) United States
(12) Reissued Patent
Davis et al.

(10) Patent Number: US RE39,311 E
(45) Date of Reissued Patent: Oct. 3, 2006

(54) HERMETICALLY SEALED COSMETIC COMPACT CASE

(75) Inventors: Lawrence G. Davis, Menomonee Falls, WI (US); Carol J. Nikolaus, Shorewood, WI (US)

(73) Assignee: Rexam Beauty and Closures Inc., Sussex, WI (US)

(21) Appl. No.: 09/469,494

(22) Filed: Jan. 4, 2000

Related U.S. Patent Documents

Reissue of:
(64) Patent No.: 5,842,486
Issued: Dec. 1, 1998
Appl. No.: 08/976,847
Filed: Nov. 25, 1997

(51) Int. Cl.
*A45D 33/00* (2006.01)

(52) U.S. Cl. ..... 132/295; 132/293; 132/301
(58) Field of Classification Search ..... 132/293, 132/294, 295, 296, 298, 301
See application file for complete search history.

(56) References Cited

U.S. PATENT DOCUMENTS

| | | | | | |
|---|---|---|---|---|---|
| 1,290,671 | A | * | 1/1919 | Sherwood | 132/83 |
| 2,094,696 | A | * | 10/1937 | De Bothelho | 132/83 |
| 2,362,120 | A | * | 11/1944 | De Swart | 132/301 |
| 2,418,578 | A | * | 4/1947 | Crane | 220/60 |
| 3,442,414 | A | * | 5/1969 | Pelli | 132/301 |
| 3,788,027 | A | * | 1/1974 | Figari | 53/24 |
| 3,810,090 | A | * | 5/1974 | Davis, Jr. et al. | 340/58 |
| 3,919,549 | A | * | 11/1975 | Sahores et al. | 250/310 |
| 4,018,237 | A | * | 4/1977 | Steiman | 132/83 R |
| 4,254,775 | A | * | 3/1981 | Langer | 128/419 D |
| 4,347,943 | A | | 9/1982 | Hackwell et al. | 220/306 |
| 4,454,889 | A | * | 6/1984 | Contreras, Sr. | 132/301 |
| 4,466,196 | A | * | 8/1984 | Woodruff | 33/288 |
| 4,471,880 | A | | 9/1984 | Taylor et al. | 220/306 |
| 4,586,519 | A | * | 5/1986 | Seidler et al. | 132/83 R |
| 4,756,140 | A | | 7/1988 | Gannon | 53/434 |
| 4,781,288 | A | * | 11/1988 | Wing | 206/37 |
| 4,917,131 | A | * | 4/1990 | Contreras, Sr. | 132/301 |
| 5,078,159 | A | * | 1/1992 | Yuhara | 132/301 |
| 5,107,871 | A | * | 4/1992 | Butcher et al. | 132/301 |
| 5,135,012 | A | * | 8/1992 | Kamen et al. | 132/294 |
| 5,139,165 | A | | 8/1992 | Hara | |
| 5,323,794 | A | * | 6/1994 | Favre | 132/294 |
| 5,353,818 | A | * | 10/1994 | Suzuki et al. | 132/300 |
| 5,431,177 | A | * | 7/1995 | Kecman | 132/303 |
| 5,515,875 | A | * | 5/1996 | Acker et al. | 132/292 |

(Continued)

FOREIGN PATENT DOCUMENTS

| | | |
|---|---|---|
| CH | 380299 | 9/1964 |
| EP | 0 919 156 | 6/1999 |
| FR | 2576496 | 8/1986 |
| GB | 599452 | 3/1948 |
| WO | WO 83/02051 | 6/1983 |
| WO | WO 98/36985 | 8/1998 |

OTHER PUBLICATIONS

U.S. Appl. No. 09/472,573, titled "Hermetically Sealed Cosmetic Compact Case" as filed Dec. 27, 1999, including specification, claims and drawings identifying inventors Nikolaus, Davis, Rowland III, Thalheimer, Everson and Katz (30 sheets).

*Primary Examiner*—Paul J. Hirsch
(74) *Attorney, Agent, or Firm*—Foley & Lardner LLP

(57) ABSTRACT

A hermetically sealed compact contains a cosmetic substance. The compact includes an integral two-piece insert having a cover piece coupled to a base piece by an integral living hinge. The cover piece of the insert has a circular cavity with a pair of ridges, while the base piece has a peripheral wall that slides within a groove to form the seal. As the integral insert obtains the closed configuration, the evacuated air makes a distinctive audible sound, indicating to the user that the hermetic seal has been established.

55 Claims, 4 Drawing Sheets

U.S. PATENT DOCUMENTS 5,520,202 A * 5/1996 Arbree ..... 132/294
5,582,314 A * 12/1996 Quinn et al. ..... 220/326
5,590,024 A * 12/1996 Honda et al. ..... 361/684
5,638,838 A * 6/1997 Lombardi ..... 132/298
5,646,820 A * 7/1997 Honda et al. ..... 361/683
5,842,486 A 12/1998 Davis et al. ..... 132/295
5,875,918 A 3/1999 Sheffler et al. ..... 220/783
6,135,277 A 10/2000 Armstrong ..... 206/314
6,199,559 B1 * 3/2001 Nikolaus et al. ..... 132/294

* cited by examiner

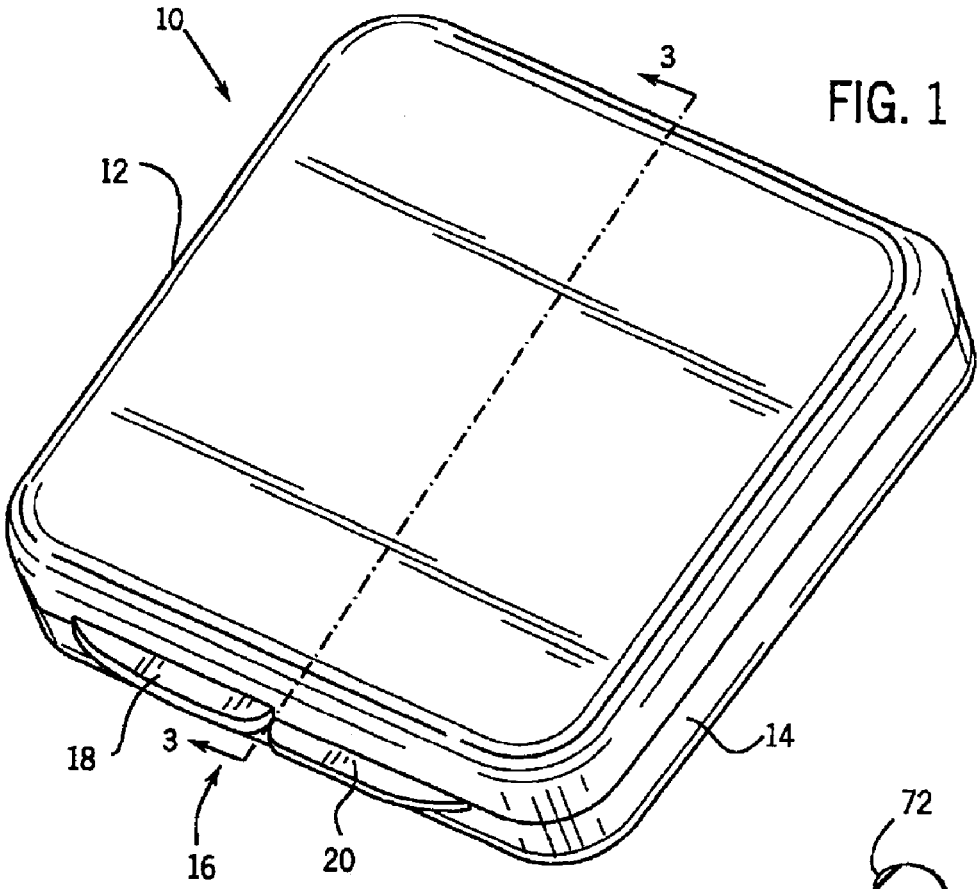
FIG. 1
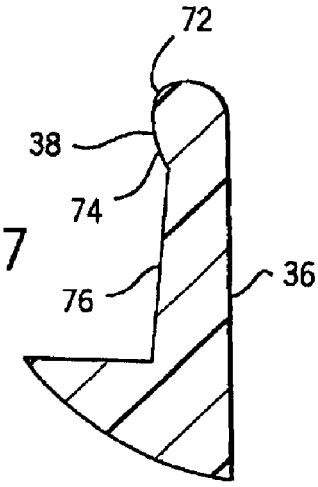
FIG. 7
FIG. 8
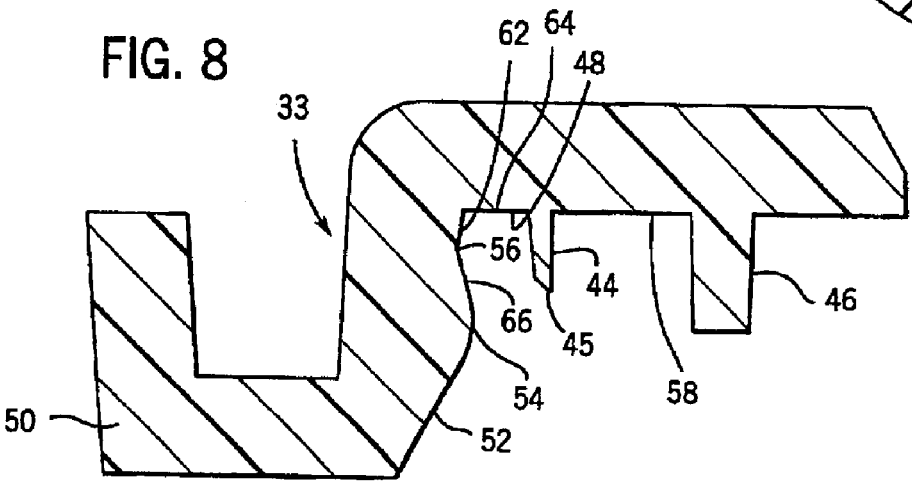

HERMETICALLY SEALED COSMETIC COMPACT CASE

Matter enclosed in heavy brackets [ ] appears in the original patent but forms no part of this reissue specification; matter printed in italics indicates the additions made by reissue.

FIELD OF THE INVENTION

The present invention relates to a make-up case or a cosmetic compact. More particularly, the present invention relates to an air-tight or hermetically sealed cosmetic compact case.

BACKGROUND

Conventional compact cases hold makeup or cosmetics, such as, powders, eye shadow, eyeliner, lipstick, or other beauty aids. Compacts often provide a mirror for viewing the face, thereby facilitating the process of applying the makeup to the face.

A compact usually includes a lid or a cover section hingeably coupled to a base or a container section. Either the cover section or the base section can be pivoted about the hinge to obtain the closed configuration of the compact, thereby providing a convenient storage device. The mirror is typically disposed on the inside of the compact cover section. The base section of conventional compacts usually includes a metal pan for containing the makeup. Alternatively, the makeup can be directly stored in a cavity in the base section.

Compacts also allow for a pad, a brush, or other application device to be disposed between the makeup and the cover, when the compact is in the closed configuration. Makeup is usually applied by rubbing or dipping the application device (e.g., the pad or brush) in the pan or cavity holding the makeup. The application device is then used to transfer the makeup to the face.

A popular type of cosmetic currently available in most retail stores is a Color-Stay™ or color-fast makeup or cosmetic. The popularity of these cosmetics apparently stems from the ability of the makeup to remain applied to the skin surface for a prolonged period of time without rubbing off or fading. Color-fast cosmetics contain a somewhat volatile chemical component that requires air-tight or hermetic storage to prevent or inhibit drying, hardening, and cracking of the cosmetics. In particular, the color-fast cosmetic must be stored in a hermetically sealed container. Therefore, color-fast cosmetic containers often must undergo and pass a loss-in-weight test to establish that an air-tight seal has been effected.

Conventional compacts are usually arranged as a one-piece unit so that one hand opens and holds the compact, while the other hand applies the makeup to the skin surface of the face. In contrast, conventional color-fast cosmetic cases include a container with a screw-on cap that effects a hermetic seal when in the closed configuration. Thus, the user must contend with two separate pieces, which makes applying the makeup a more difficult task, i.e., it is more difficult for the user to unscrew the cap and apply the makeup at the same time.

To apply the color-fast cosmetic from its cosmetic case, the user must unscrew the cap and place it somewhere so that one hand can hold the container that stores the makeup, while the other hand is free to apply the makeup to the skin surface of the face with greater dexterity. In having to lay the screw-on cap somewhere during the process of applying the color-fast makeup, the potential exists for the cap to be misplaced or lost, especially in a crowded public restroom during a social function. Without the screw-on cap to hermetically seal the unused portion still remaining in the container, the color-fast makeup dries, hardens, and its quality deteriorates. As a result, the user must incur an additional expense by purchasing new makeup.

Another problem with current color-fast cosmetic cases occurs when the user is not aware that the screw-on cap is not properly closed, e.g., sealed, on the container. If the hermetic seal is not established as a result of incomplete or improper closure of the color-fast cosmetic case, the makeup dries, hardens, and cracks.

Other color-fast makeup cases utilize a complex method of opening and closing. These cases require that the user follows unconventional directions to appropriately open and close the makeup case. Thus, these cases often require additional steps to open and close the case which can annoy the user.

Thus, there is a need for an inexpensive and simple-to-use compact case capable of effecting an air-tight or hermetic seal. Further, there is a need for an air-tight, hermetically sealed compact case that passes the loss-in-weight test. Further still, there is a need for a hermetically sealed compact case that can be manufactured as a one-piece unit and can be simply opened and closed. Even further still, there is the need for an air-tight compact case that generates an audible indication whenever the hermetic seal is established.

SUMMARY OF THE INVENTION

The present invention relates to a makeup container. The makeup container includes a cover piece and a base piece for holding a cosmetic substance. The cover piece has a first interface having a first periphery, and the base piece has a second interface having a second periphery corresponding to the first periphery. The first interface and the second interface provide a hermetic seal when the cover piece is closed with respect to the base piece. The seal is comprised of a groove associated with the first interface or the second interface and a peripheral rim associated with the first interface or the second interface.

The present invention further relates to a compact for containing a cosmetic substance with an air-tight seal. The compact includes a first section and a second section. The first section engages the second section to form the air-tight seal. The air-tight seal maintains the first section in a closed position with respect to the second section.

The present invention still further relates to a makeup case for holding a cosmetic substance. The case includes a cover and a base for holding makeup. The cover is moveable to an upper, open position and to a lower, closed position. The improvement comprises a hermetic seal when the cover is in the lower, closed position. The seal maintains the cover in a closed position.

According to one exemplary aspect of the present invention, an air-tight or hermetic seal is provided by a plastic insert sized and shaped to fit or snap inside a conventional compact shell. In particular, the insert is an integral two-section (e.g., a cover and a base) component that utilizes a living hinge to connect a first section (e.g., the cover) to a second section (e.g., the base). The integral component advantageously lowers manufacturing costs since fewer separate pairs are required and less assembly is involved. Moreover, post-production costs are also minimized since there is only one part to inventory for the insert.

According to another exemplary aspect of the present invention, the first section of the integral insert engages the second section to effect an air-tight or hermetic seal when the insert is in a closed configuration. In particular, the first section of the integral insert has a circular cavity with a groove, while the second section has a peripheral wall that slides in the groove to form the seal. As the integral insert obtains the closed configuration, e.g., when the first section engages the second section, the evacuated air makes a distinctive audible sound, indicating to the user that the air-tight seal has been established. Furthermore, the hermetic seal is maintained without a need for an auxiliary latch or fastener.

DESCRIPTION OF THE DRAWINGS

Exemplary embodiments of the present invention will hereinafter be described wherein like numerals donate like elements, and:

FIG. 1 is a perspective view of a cosmetic compact case in accordance with an exemplary embodiment of the present invention, the case is shown in a closed configuration;

FIG. 7 is an enlarged, partial cross-sectional view of a lip illustrated in FIG. 4; and FIG. 8 is an enlarged, partial cross-sectional view of a groove illustrated in FIG. 4.

DETAILED DESCRIPTION

Figure 2:
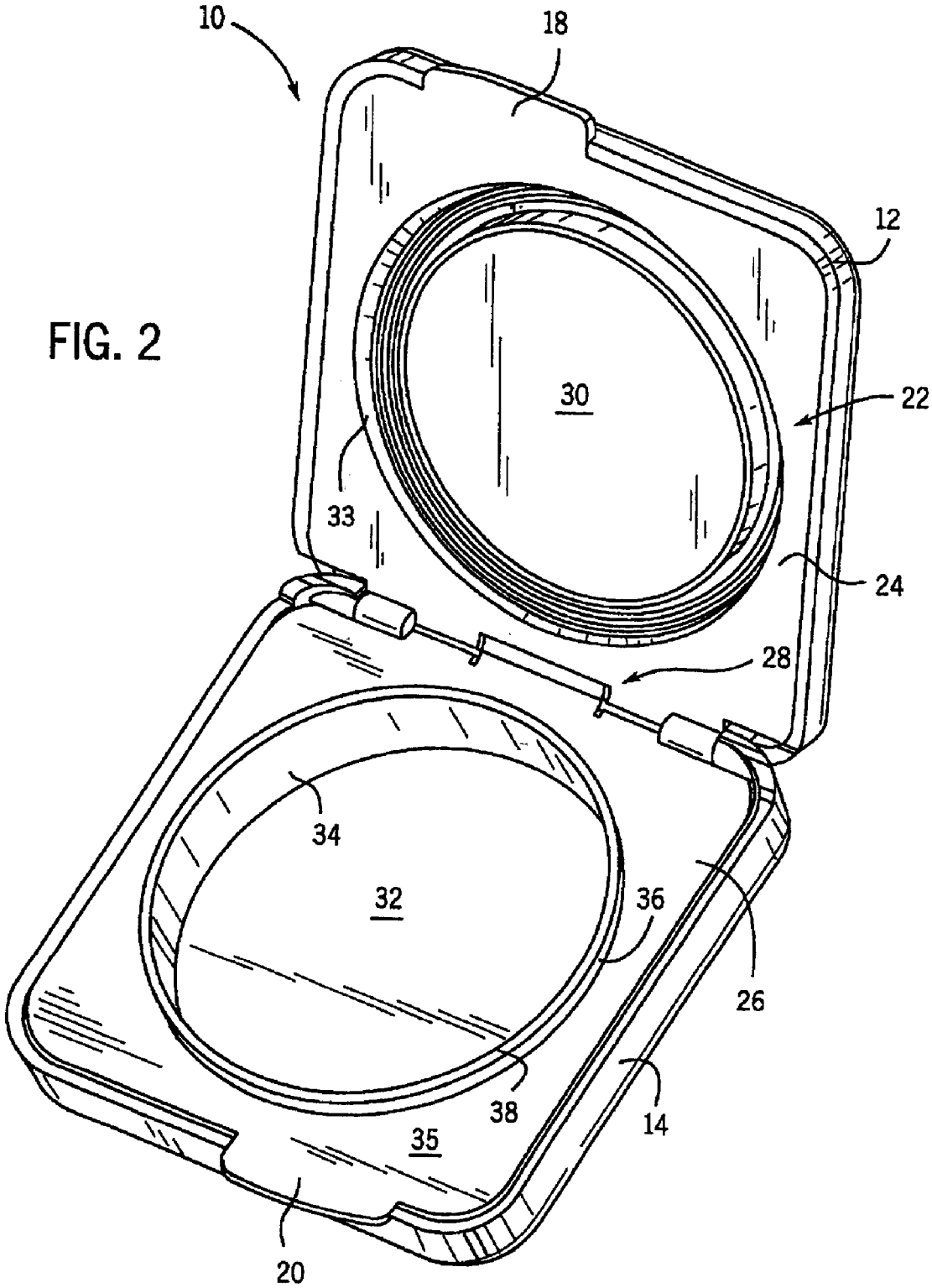
FIG. 2 is a perspective view of the cosmetic compact case illustrated in FIG. 1 in an open configuration, demonstrating an integral two-piece insert contained therein.
Figure 3:
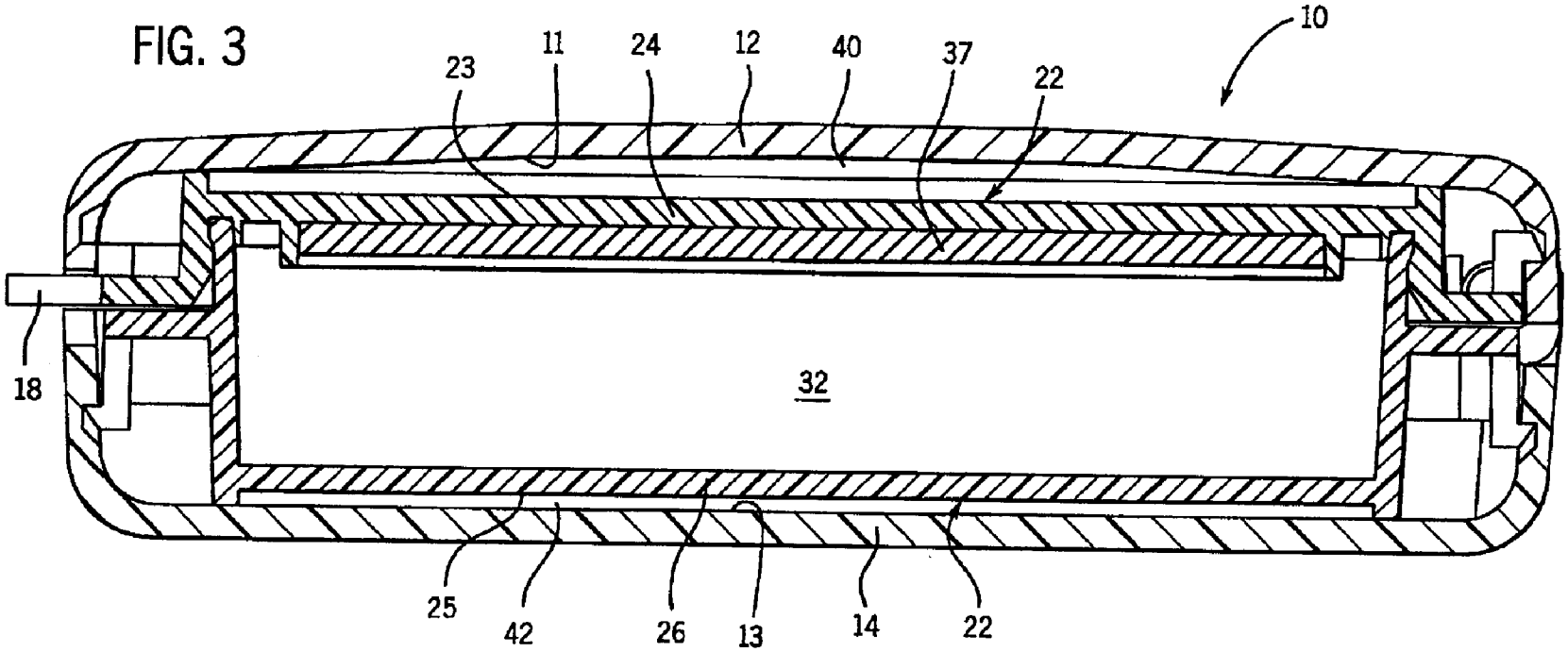
FIG. 3 is a cross-sectional view of the closed cosmetic compact case illustrated in FIG. 1, taken along line 3—3.

With reference to FIGS. 1, 2, and 3, a makeup case or compact 10 is shown. Compact 10 is a cosmetic case for holding a cosmetic substance, such as, powder, eye shadow, eyeliner, or other beauty aid. In particular, compact 10 is preferably a cosmetic case for containing a color-fast, e.g., a nonfading and rub-resistant, makeup with an air-tight seal.

FIG. 1 is a perspective view showing compact 10 in a closed configuration. Compact 10 includes an exterior shell which is comprised of a top or cover section 12 hingeably coupled (FIG. 2) to a bottom or a base section 14. Compact 10 also includes an opening interface 16. Interface 16 includes a top member 18 and a bottom member 20. Interface 16 facilitates opening of compact 10 when top member 18 engages bottom member 20. Alternatively, interface 16 can include a pivoting member similar to conventional shoe polish canisters.

As an external downward force is applied, such as, by hand, to cover section 12 to effect pivotal motion in a direction toward base section 14, compact 10 achieves a closed configuration. As section 12 approaches section 14 and achieves the closed configuration, the traditional snapping sound associated with the closing of a conventional compact is emitted. Interface 16 can also be configured to perform a latching operation for compact 10. Although compact 10 is shown in a quadrangular shape, other geometries, such as, oval, circular, hexagonal, and so forth, can also be used.

With reference to FIG. 2, compact 10 is shown in an open configuration. Compact 10 further includes an integral two-piece insert 22. Insert 22 preferably includes a top or cover piece 24 integral with a bottom or base piece 26. More specifically, cover piece 24 of insert 22 is pivotally coupled to base piece 26 via a living hinge 28. Insert 22 is shaped in accordance with compact 10 and is sized to fit within the combination of sections 12 and 14. Insert 22 is preferably made of a polypropylene plastic.

Figure 4:
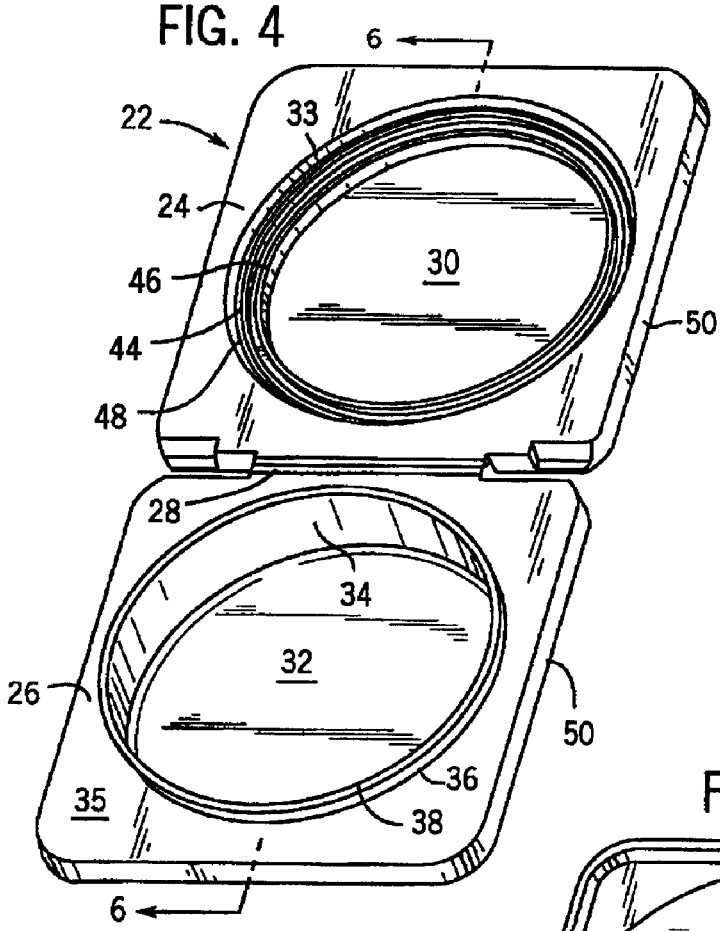
FIG. 4 is a top perspective view of the integral two-piece insert illustrated in FIG. 2.

Cover piece 24 of insert 22 includes a circular cavity 30 having a periphery (see FIG. 4). In one preferred embodiment, a mirror can be disposed within circular cavity 30 for viewing the face when applying the makeup. Similarly, base piece 26 has a circular cavity 32 defined by a peripheral wall 34. A peripheral rim 36 is integral with (e.g., continuous) with peripheral wall 34, circumferentially extends above a surface 35 of base piece 26, and melds into a terminal, outwardly-protruding lip 38. Circular cavity 32 is preferably configured to hold the color-fast makeup. Alternatively, instead of circular cavity 32, base piece 26 can include an aperture configured such that a pan prefilled with makeup can be disposed therein.

FIG. 3 is a cross-sectional view of compact 10 in a closed configuration, taken along line 3—3 of FIG. 1. Circular cavity 30 within piece 24 is shown with a mirror 37 disposed therein. Circular cavity 32 is shown in an empty state. Compact 10 also includes interface gaps 40 and 42. Interface gap 40 is disposed between an internal surface 11 of cover 12 and an exterior surface 23 of cover piece 24 of insert 22. Interface gap 42 is disposed between an internal surface 13 of base section 14 and an external surface 25 of base piece 26 of insert 22. Interface gaps 40 and 42 are configured to be large enough to allow expansion of cover piece 24 and base piece 26, respectively, of insert 22 during loss-in-weight tests.

Figure 5:
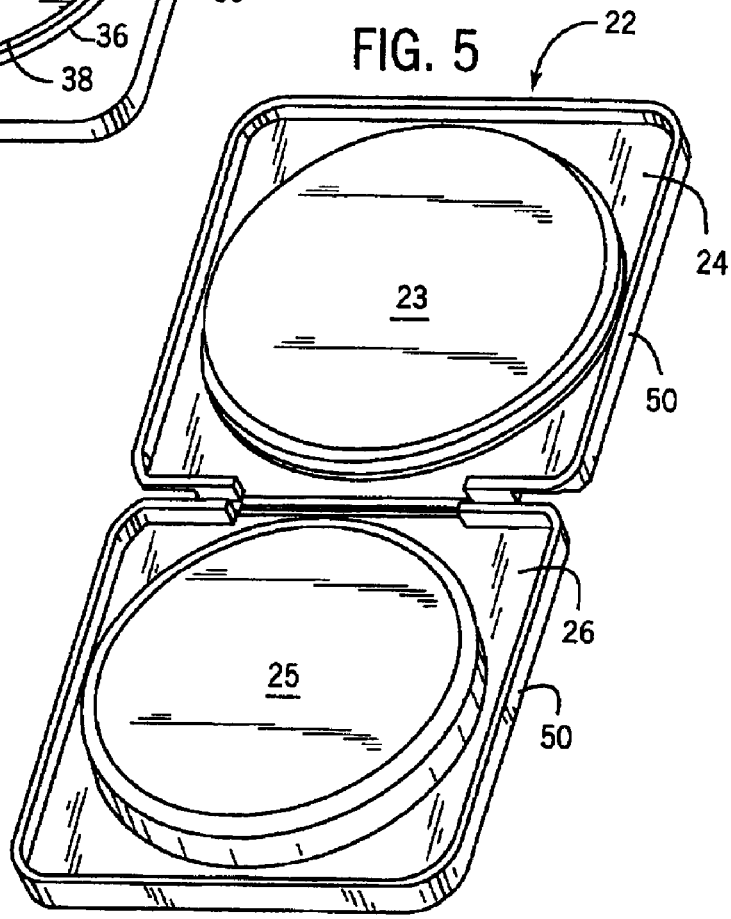
FIG. 5 is a bottom perspective view of the integral two-piece insert illustrated in FIG. 4.

FIGS. 4 and 5 show insert 22 in a fully extended, opened configuration. In particular, FIG. 4 is a top perspective view of insert 22, whereas FIG. 5 is a bottom perspective view. A groove 48 is circumferentially defined between a peripheral edge 33 of cavity 30 and shorter peripheral wall 44. Groove 48 is configured to receive peripheral rim 36 when insert 22 is in a closed configuration (e.g., when cover piece 24 engages base piece 26), thereby effecting a hermetic, i.e., air-tight, seal. Insert 22 does not have, nor needs, a clasp or fastener to sustain a closed configuration: the hermetic seal maintains insert 22 in a closed state.

As shown in the bottom perspective view of insert 22 (FIG. 5), the perimeter of cover piece 24 and base piece 26 is defined by a continuous peripheral rim 50 that overhangs in the direction toward external surfaces 23 and 25, respectively. Rim 50 can be utilized to secure or snap insert 22 within sections 12 and 14. Rim 50 is preferably configured to span a height of 0.16 inch.

In one preferred embodiment, when in the fully extended configuration, insert 22 spans a length of 6 inches, having a respective 3-inch length for both cover piece 24 and base piece 26. Alternatively, insert 22 can have other dimensions complementary to fit any sized compact 10.

Figure 6:
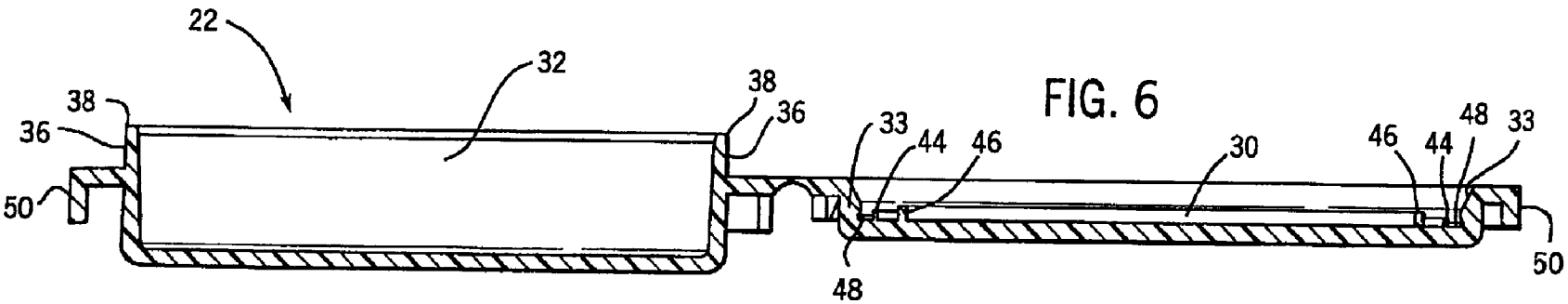
FIG. 6 is a cross-sectional view of the insert illustrated in FIG. 4 about line 6—6.

With reference to FIG. 6, a cross-sectional view of insert 22 in the fully extended configuration is shown, taken about line 6—6 of FIG. 4. Living hinge 28 is shown fully extended and circular cavity 30 and circular cavity 32 both appear in an empty state. Lip 38 is shown protruding outwardly from peripheral rim 36. With reference to cover piece 24, groove 48 appears between shorter peripheral wall 44 and peripheral edge 33.

Both FIGS. 7 and 8 are enlarged, partial cross-sectional views of different aspects of insert 22. More specifically, FIG. 7 shows an enlarged, partial cross-sectional view of lip 38 extending from peripheral rim 36. FIG. 8 is an enlarged, partial cross-sectional view showing groove 48 disposed between peripheral wall 44 and peripheral edge 33. FIG. 8 further shows that peripheral wall 44 terminates in a free end 45 and spans a height that is shorter than a height of peripheral wall 46. Wall 46 can serve to hold a mirror in cavity 30.

As shown in FIG. 8, peripheral edge 33 includes a chamfer edge 52, a bulge 54 protruding in a direction toward groove 48, and an indentation 56 pointed in a direction away from wall 44. A groove 58 is disposed between shorter peripheral wall 44 and peripheral wall 46.

In one preferred embodiment, the nominal thickness of peripheral wall 34 (FIG. 4) is 0.06 inches. The height of peripheral rim 36 (FIG. 7), including lip 38, is preferably 0.172 inches, with a width of 0.032 inches (without lip 38). Lip 38 preferably has a width of 0.043 inches and a height of 0.027 inches. Lip 38 has a radius of 0.025 inches at an end 72. A surface 74 is provided at a 20° angle with respect to a surface 76.

Peripheral wall 44 (FIG. 8) preferably has a height of 0.045 inches and a thickness of 0.016 inches. Wall 46 preferably has a height of 0.07 inches and a thickness of 0.04 inches. A free end 45 of wall 44 is slanted at a 45° angle with respect to a vertical axis. The surface of wall 44 bordering groove 48 is slightly slanted at an 8° angle with respect to the vertical axis. A wall 62 associated with indent 56 is provided at a 10° angle from the vertical axis.

Bulge 54 of peripheral edge 33 is curved with a radius of 0.025 inches. Groove 48 has a width of 0.040 inches and wall 62 has a height of 0.024 inches. Bulge 54 is at a distance of 0.060 inches from a surface 64 of groove 48 and terminates at a distance of 0.080 inches from surface 64. A wall 66 has a height of 0.036 inches and is provided at a 15° angle from the vertical axis.

Alternatively, other dimensions can be used. The given dimensions are exemplary only and do not limit the scope of the claims.

The closing and opening of insert 22 is discussed as follows. To close insert 22, an external downward force is supplied, such as, by hand, to cover piece 24 to effect a pivotal motion of cover piece 24 toward base piece 26. More specifically, as a result of the applied downward force on cover piece 24, hinge 28 folds to close cover piece 24 onto base piece 26.

In the process of closing insert 22, groove 48 receives peripheral rim 36 between first peripheral wall 44 and peripheral edge 33 (FIGS. 4, 6, and 8), thereby effecting a hermetic, i.e., air-tight, seal at the interface. The seal can be formed between peripheral wall 34 and peripheral wall 44 or rim 36 and edge 33. Moreover, bulge 54 of peripheral edge 33 pushes peripheral rim 36 to bias peripheral wall 34 towards peripheral wall 44. Even further, lip 38 of peripheral rim 36 fits into indentation 56 of peripheral edge 33, thus securing the hermetic seal and maintaining insert 22 in the closed configuration. Compact 10 does not require a latch to maintain insert 22 in the closed configuration. As insert 22 obtains the closed configuration, the evacuated air makes a distinctive audible sound, indicating that the hermetic seal has been established. The seal associated with compact 10 is somewhat similar to seals utilized in photographic film containers or plastic food storage containers.

To open insert 22, a pulling force is applied, such as, by hand, to cover piece 24 in a direction away from base piece 26. In the process of separating or disengaging cover piece 24 from base piece 26 from the closed configuration of insert 22, peripheral rim 36 is removed from within groove 48, thereby disrupting, e.g., breaking, the hermetic seal formed at the interface between peripheral wall 34 and peripheral wall 44. As cover piece 24 is disengaged from base piece 26, another audible sound is emitted, indicating the hermetic seal has been broken. As hinge 28 unfolds, cover piece 24 is further pivotally moved in a direction away from base piece 26. The terms air-tight and hermetic, as used in this application, refer to an essentially non-leaking seal formed at atmospheric pressure. The air-tight seal can preferably pass a loss-in-weight test when the case contains color-fast makeup.

It is understood that the above description is of preferred exemplary embodiments of the present invention. The invention is not limited to the precise details and conditions disclosed. For example, the shape of the described compact is quadrangular. However, other geometries, such as, circular, oval, hexagonal, and so forth, can also be used. Although specific dimensions were given for aspects of the integral two-piece insert, other dimensions can be used complementary to fit any sized compact. Various modifications may be made of the details of the disclosure without departing from the spirit of the invention, which is defined in the appended claims.

What is claimed is:

[1. A makeup container, the container comprising:

a cover piece having a first interface, the first interface having a first periphery; and a base piece for holding a cosmetic substance, the base piece having a second interface, the second interface having a second periphery corresponding to the first periphery, wherein the first interface and the second interface provide a hermetic seal when the cover piece is closed with respect to the base piece, wherein the seal is comprised of a groove associated with the one of first interface or the second interface and a peripheral rim associated with the other of the first interface or the second interface.]

[2. The makeup container of claim 1, wherein the groove is defined by a peripheral wall and the peripheral edge of the peripheral rim being received between the first periphery and the peripheral wall.]

[3. The makeup container of claim 2, wherein the first periphery includes a bulge.]

[4. The makeup container of claim 3, wherein the first periphery and the second periphery are circular.]

[5. The makeup container of claim 1, further comprising:

an outer body coupled about the cover piece and the base piece, wherein the outer body includes a cavity, the cavity allowing expansion of the cover piece or the base piece.]

[6. The makeup container of claim 5, wherein the cavity is large enough to allow expansion during loss-in-weight tests.]

[7. The makeup container of claim 6, wherein the first piece and the second piece are integral and joined by a living hinge.]

[8. A compact for containing a cosmetic substance with an air-tight seal, the compact comprising:

a first section; and a second section, the first section engaging the second section to form the air-tight seal, the air-tight seal maintaining the first section in a closed position with respect to the second section.]

[9. The compact of claim 8, wherein the compact makes an audible sound indicating the air-tight seal is established when the first section engages the second section.]

[10. The compact of claim 9, wherein the first section has a first circular cavity, the circular cavity having a first peripheral wall, wherein the second section has a second peripheral wall, the second peripheral wall sliding between the first peripheral wall and an edge of the first circular cavity to form the seal.]

[11. The compact of claim 10, wherein the peripheral wall includes a lip.]

[12. The compact of claim 11, wherein the lip extends away from an outside surface of the rim.]

[13. The compact of claim 10, wherein the second section has a second circular cavity for holding the cosmetic substance, the second circular cavity being defined by the second peripheral wall.]

[14. A makeup case for holding a cosmetic substance, the case including a cover and a base, the base including makeup, the cover being movable to an upper, open position and to a lower, closed position, an improvement comprising:

a hermetic seal when the cover is in the lower, closed position, whereby the seal maintains the cover in a closed position.]

[15. The makeup case of claim 14, wherein the seal is comprised of a groove associated with the cover and a peripheral rim associated with the base, the rim being received in the groove when the cover is closed.]

[16. The makeup case of claim 15, wherein the improvement makes an audible sound when the cover is brought to the closed position.]

[17. The makeup case of claim 16, wherein the improvement makes another audible sound when the cover is brought to the upper position from the closed position.]

[18. The makeup case of claim 15, wherein the groove includes a first peripheral wall and an edge.]

[19. The makeup case of claim 18, wherein all components associated with the seal are integral the base and the cover.]

[20. The makeup case of claim 19, wherein the first peripheral wall is shorter than the edge.]

*21. A makeup container, the container comprising:*

*a cover piece having a first interface, the first interface having a first periphery; and*

*a base piece for holding a cosmetic substance, the base piece having a second interface, the second interface having a second periphery corresponding to the first periphery, wherein the first interface and the second interface provide a hermetic seal when the cover piece is closed with respect to the base piece, wherein the seal comprises a groove associated with one of the first interface or the second interface and a peripheral rim associated with the other of the first interface or the second interface;*

*a housing having a base coupled to a cover wherein the cover piece and the base piece are configured to fit at least partially within the housing.*

*22. The makeup container of claim 21, wherein the groove is defined by a peripheral wall and the peripheral edge of the peripheral rim being received between the first periphery and the peripheral wall.*

*23. The makeup container of claim 22, wherein the first periphery includes a bulge.*

*24. The makeup container of claim 23, wherein the first periphery and the second periphery are circular.*

*25. The makeup container of claim 21, wherein the housing comprises an outer body coupled about the cover piece and the base piece, wherein the outer body includes a cavity, the cavity allowing expansion of the cover piece or the base piece.*

*26. The makeup container of claim 25, wherein the cavity is large enough to allow expansion during loss-in-weight tests.*

*27. The makeup container of claim 26, wherein the cover piece and the base piece are integral and joined by a living hinge.*

*28. The makeup container of claim 21, wherein the base of the housing is hingeably coupled to the cover of the housing.*

*29. The makeup container of claim 28, wherein the base piece and the cover piece comprise an insert.*

*30. The makeup container of claim 29, wherein the insert is configured to fit within the housing in a snap fit arrangement.*

*31. The makeup container of claim 29, wherein the rim is configured to secure the insert at least partially within the housing.*

*32. The makeup container of claim 31, wherein the rim is configured to couple the insert at least partially within the housing in a snap fit arrangement.*

*33. The makeup container of claim 28, wherein at least one of the base piece and the cover piece include an interface for selectively moving the base of the housing relative to the cover of the housing.*

*34. The makeup container of claim 28, wherein the housing comprises a shell.*

*35. The makeup container of claim 28, wherein the rim comprises an overhang.*

*36. The makeup container of claim 28, wherein the housing comprises a container.*

*37. The makeup container of claim 23, wherein the bulge is curved.*

*38. The makeup container of claim 31, wherein the rim is curved.*

*39. A compact for containing a cosmetic substance with an air-tight seal, the compact comprising:*

*a first section; and*

*a second section, the first section engaging the second section to form the air-tight seal, the air-tight seal maintaining the first section in a closed position with respect to the second section;*

*a housing configured for retaining the first section and the second section at least partially within the housing in a snap fit arrangement.*

*40. The compact of claim 39, wherein the compact makes an audible sound indicating the air-tight seal is established when the first section engages the second section.*

*41. The compact of claim 40, wherein the first section has a first circular cavity, the circular cavity having a first peripheral wall, wherein the second section has a second peripheral wall, the second peripheral wall sliding between the first peripheral wall and an edge of the first circular cavity to form the seal.*

*42. The compact of claim 41, wherein the peripheral wall includes a lip.*

*43. The compact of claim 42, wherein the lip extends away from an outside surface of a rim.*

*44. The compact of claim 41, wherein the second section has a second circular cavity for holding the cosmetic substance, the second circular cavity being defined by the second peripheral wall.*

*45. The compact of claim 39, wherein the housing comprises a shell.*

*46. The compact of claim 39, wherein the lip is curved.*

*47. The compact of claim 45, wherein the shell comprises a base and a cover.*

*48. The compact of claim 45, wherein the first section and the second section comprise an insert.*

*49. The compact of claim 48, wherein the insert is configured to fit at least partially inside the shell.*

*50. The compact of claim 49, further comprising a hinge configured to couple the base of the shell to the cover of the shell.*

*51. The compact of claim 49, wherein the rim is configured to secure the insert at least partially within the shell.*

*52. The compact of claim 51, wherein the rim is configured to couple the insert at least partially within the shell in the snap fit arrangement.*

*53. A makeup case for holding a cosmetic substance, the case including a cover and a base, the cover being movable to an open position and to a closed position, an improvement comprising:*

*a hermetic seal when the cover is in the closed position whereby the seal maintains the cover in the closed position;*

*an outer body configured for retaining the cover and the base within the body.*

*54. The makeup case of claim 53, wherein the seal comprises a groove associated with the cover and a peripheral rim associated with the base, the rim being received in the groove when the cover is in the closed position.*

*55. The makeup case of claim 54, wherein the improvement makes an audible sound when the cover is brought to the closed position.*

*56. The makeup case of claim 55, wherein the improvement makes another audible sound when the cover is brought to the open position from the closed position.*

*57. The makeup case of claim 54, wherein the groove includes a first peripheral wall and an edge.*

*58. The makeup case of claim 57, wherein the base is integral with the cover.*

*59. The makeup case of claim 58, wherein the first peripheral wall is shorter than the edge.*

*60. The makeup case of claim 53, wherein the outer body comprises a container.*

*61. The makeup case of claim 60, wherein the container comprises a shell.*

*62. The makeup case of claim 61, wherein the base and cover comprise an insert.*

*63. The makeup case of claim 62, wherein the size of the base of the insert corresponds to the size of the base of the shell.*

*64. The makeup case of claim 63, wherein the insert is configured for retention within the shell in a snap fit arrangement.*

*65. The makeup case of claim 61, wherein the rim is configured to secure the insert at least partially within the shell.*

*66. The makeup case of claim 65, wherein the rim is configured to couple the insert within the shell in a snap fit arrangement.*

*67. A compact for storing makeup comprising:*

*a first platform coupled to a second platform and configured for selective movement between a first position and a second position relative to the first platform;*

*a rim extending from the second platform;*

*a channel disposed between a first wall and a second wall of the first platform and having at least three sealing surfaces;*

*wherein when the second platform is in the first position the rim is received by the channel to provide a hermetic seal between the first platform and the second platform at two of the sealing surfaces.*

*68. The compact of claim 67, wherein at least one of the sealing surfaces comprises a wall.*

*69. The compact of claim 68, wherein the at least one sealing surface comprises a bulge.*

*70. The compact of claim 69, further comprising a housing configured to receive the first platform and the second platform.*

*71. The compact of claim 69, wherein the channel has a width less than the width of the rim.*

*72. The compact of claim 69, wherein the rim comprises a curved terminal end.*

*73. The compact of claim 69, wherein the bulge is curved.*

*74. A container for storing cosmetics comprising:*

*base means for providing a base;*

*cover means for providing a cover selectively positionable between a first position and a second position relative to the base means;*

*seal means for forming a hermetic seal between the cover means and the base means wherein the seal means comprises:*

*a curved rim extending from one of the cover means or the base means and a groove configured for receiving the rim disposed between a first wall and a second wall extending from one of the cover means or the base means;*

*a housing configured for retaining the base means and the cover means;*

*wherein the hermetic seal is formed when the cover means is in the first position.*

*75. The container of claim 74, wherein the seal means comprises an insert.*

* * * * *